United States Patent

[11] 3,557,339

| [72] | Inventor | Herbert F. Rondeau<br>Winchester, Mass. |
|---|---|---|
| [21] | Appl. No. | 813,239 |
| [22] | Filed | Apr. 3, 1969 |
| [45] | Patented | Jan. 19, 1971 |
| [73] | Assignee | Warren Fastener Corporation<br>Mt. Clemens, Mich.<br>a corporation of Michigan |

[54] NONCONSUMABLE, REUSABLE STUD WELDING FERRULE
8 Claims, 14 Drawing Figs.

| [52] | U.S. Cl. | 219/99 |
|---|---|---|
| [51] | Int. Cl. | B23k 9/20 |
| [50] | Field of Search | 219/99, 98, 127, 136 |

[56] References Cited
UNITED STATES PATENTS

| 2,416,204 | 2/1947 | Nelson | 219/99 |
|---|---|---|---|
| 3,038,989 | 6/1962 | Moerman | 219/99 |

*Primary Examiner*—J. V. Truhe
*Assistant Examiner*—R. E. O'Neill
*Attorneys*—W. Bigelow Hall, Richard A. Wise and Scott R. Foster

ABSTRACT: Stud welding means and method including the use of a semipermanent ferrule which is connected to a welding gun by a ferrule holder. The ferrule is electrically conductive to sustain electron flow in a direction opposite to the direction of electron flow in the stud being welded.

PATENTED JAN 19 1971

*Inventor*
Herbert F. Rondeau
By his Attorney 3,557,339

NONCONSUMABLE, REUSABLE STUD WELDING FERRULE

BACKGROUND OF THE INVENTION

1. Field of the Invention

This invention relates to stud welding and is directed more particularly to stud welding with a semipermanent reusable and substantially nonconsumable ferrule.

2. Description of the Prior Art

In the welding of metal studs to metal supports it has been common to utilize a ferrule, usually ceramic, which is annular in general configuration and which surrounds the end of the stud to be joined to the support. The ferrule serves to confine molten metal to the immediate vicinity of the weld, to retard escape of heat from the weld area, and to serve as a safety collar. It may also be used to serve as a container for inert gas shielding, or if the welding is done in air, may serve to limit the oxygen available in the weld region.

In common practice such ferrules are usually of ceramic material and are normally usable in only one welding operation. Reuse of the ferrule is usually not feasible because the ceramic material of the ferrule reacts with the molten stud, rendering the ferrule unusable in a subsequent operation. Further, if the stud is threaded, the ferrule cannot be removed over rolled threads. Often the ceramic ferrule cracks during the welding operation. Even when it remains intact, however, it is usually more economical to simply break the ferrule, as by a hammer blow, and use a new ferrule in the next welding operation. Accordingly, as a practical matter, such ferrules are used only once.

The practice of using a new ferrule for each welding operation involves not only the obvious expense of buying and storing a large quantity of such ferrules, but also the time-consuming operations of placing a ferrule for each weld and thereafter removing the ferrule, usually by destructive means.

SUMMARY OF THE INVENTION

It is an object of the invention to provide a semipermanent ferrule for use in stud welding, which ferrule is susceptible of use in several hundred welding operations before replacement is necessary.

It is a further object of the invention to provide means for attaching the semipermanent ferrule to a welding gun in such a manner that in making the gun ready for a stud welding operation, the ferrule is necessarily brought into proper position, thereby eliminating the usual ferrule positioning operation.

It is still a further object of the invention to so arrange the ferrule and ferrule holding means as to facilitate a method of welding wherein the direction of electron flow in the electrically conductive ferrule is opposite to the direction of electron flow in the stud being welded, whereby to provide a flux field which tends to influence the electron-bearing molten metal produced by the welding operation to concentrate annularly around the base of the stud.

With the above and other objects in view, as will hereinafter appear, a feature of the present invention is the provision of a semipermanent ferrule. In accordance with a further feature of the invention there is provided a means for connecting the ferrule to a welding gun. In accordance with a still further feature of the invention there is provided a method for stud welding in which current flow is such as to confine the molten metal to the immediate vicinity of the weld.

The above and other features of the invention, including various novel details of construction and combinations of parts, will now be more particularly described with reference to the accompanying drawings and pointed out in the claims. It will be understood that the particular device and method embodying the invention is shown by way of illustration only and not as a limitation of the invention. The principles and features of this invention may be employed in various and numerous embodiments without departing from the scope of the invention.

BRIEF DESCRIPTION OF THE DRAWING

Reference is made to the accompanying drawings in which there is shown an illustrative embodiment of the invention from which its novel features and advantages will be apparent.

DESCRIPTION OF THE PREFERRED EMBODIMENTS

Figure 1:
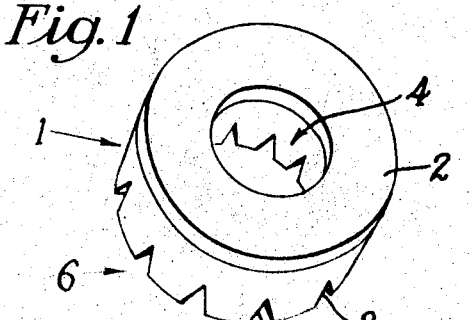
FIG. 1 is a perspective view of one form of ferrule illustrative of an embodiment of the invention.
Figure 2:
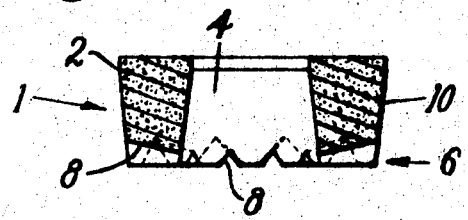
FIG. 2 is an elevational sectional view of the ferrule shown in FIG. 1.

Referring to FIGS. 1 and 2, it will be seen that the illustrative semipermanent ferrule 1 comprises and annular body 2 of electrically conductive material, as for example graphite. A central opening 4 extends throughout the length of the body and serves to receive a stud to be welded and substantially enclose one end thereof. At one end 6 of the body 2, the body is provided with peripheral generally V-shaped outlets or notches 8 which permit limited escape of gases during the welding operation. A major portion 10 of the exterior wall of the body may be conically shaped to be received by a complementary shaped ferrule holder for purposes to be described hereinbelow.

Figure 3:
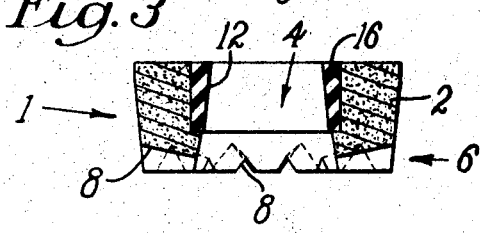
FIGS. 3—7 are elevational sectional views of other ferrules, illustrative of alternative embodiments of the invention.
Figure 4:
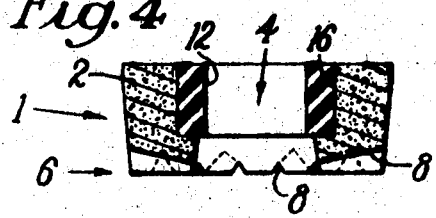
Figure 5:
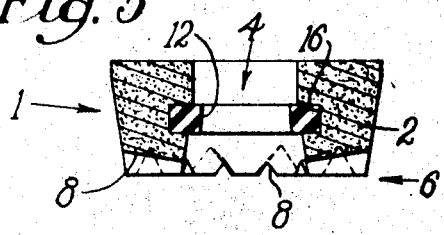
Figure 6:
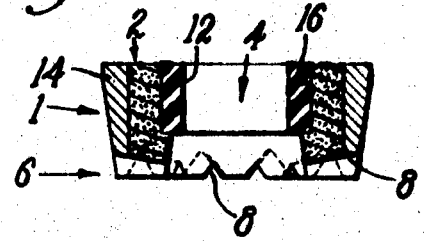
Figure 10:
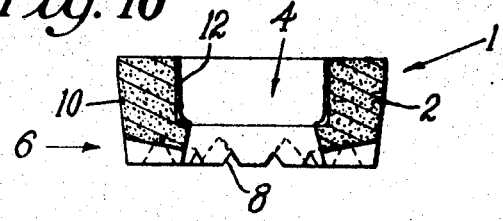
FIG. 10 is an elevational sectional view of still another ferrule, illustrative of another alternative embodiment of the invention.

Referring to FIGS. 3—6, it will be seen that alternative embodiments of the ferrule include an interior ring 12 of insulating material, as for example boron nitride, which may be molded in place in the ferrule, added to the ferrule as a preformed sleeve, or deposited in the ferrule as by vacuum means to form an insulative coating therein (see FIG. 10). To receive the ring 12 the ferrule may be provided with a circular recess 16. In the event of an inadvertant misalignment of stud and ferrule, the insulating ring 12 serves to separate the electrically conductive stud from the electrically conductive ferrule, thereby preventing shunting of current from the stud to the ferrule, as by direct contact or by creep-up of the arc inside the ferrule. As shown in FIG. 5, the insulating ring 12 may be in the form of a washer. If the insulating ring is in the form of a sleeve, as shown in FIGS. 3, 4 and 6, such sleeve may be removable for subsequent use with other ferrules, or such sleeve may be retained by the ferrule holding means, the latter to be discussed further hereinbelow. Insulating material capable of withstanding the high temperatures of welding is usually rather expensive. Accordingly, an insulating ring capable of use with several ferrules further enhances the economic advantages of the present invention.

Referring to FIG. 6, it will be seen that the ferrule body 2 may include an exterior sleeve 14, preferably of metal, as for example steel or beryllium copper, which increases the conductivity of the body 2 and also serves to increase the impact resistance of the ferrule, thereby to protect the ferrule from wear or damage from impact. This embodiment is of particular value in hand-held welding gun applications where the alignment of gun and support is more likely to be somewhat off a true normal angle and where rough handling of the welding gun, with consequent chipping of the ferrule, may otherwise occur. It will be apparent that in the embodiment shown in FIG. 6, the body 2 need not be electrically conductive, the sleeve 14 serving to make the ferrule conductive.

Figure 7:
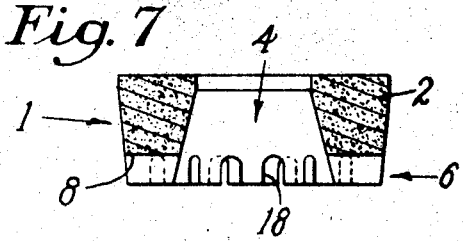
Figure 8:
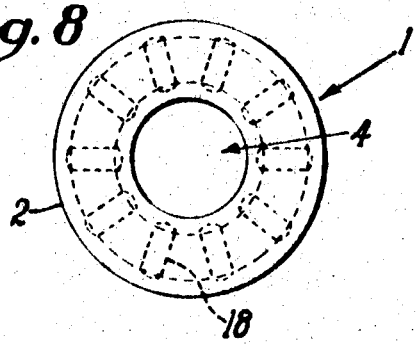
FIG. 8 is a plan view of the ferrule shown in FIG. 7.

FIGS. 7 and 8 show a ferrule similar to that shown in FIGS. 1 and 2, but having more slotlike peripheral notches or outlets 18, in lieu of the V-shaped notches or outlets 8 of FIGS. 1 and 2.

Figure 9:
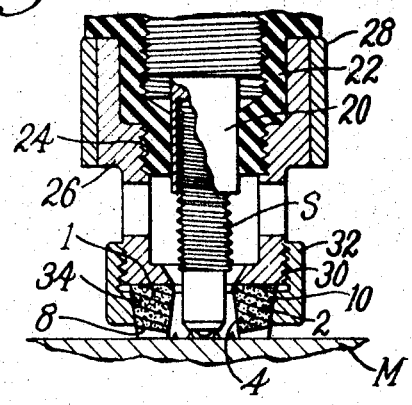
FIG. 9 is an elevational, partially sectional view of an illustrative ferrule holder shown retaining a ferrule and stud in position for a welding operation.

Referring to FIG. 9, there will now be described the means by which the ferrule is attached to a welding gun. It will be seen that a welding gun collet 20 is substantially surrounded by an insulating collar 22. For the purposes of this invention, the insulating collar 22 is provided with external threads 24 for receiving an internally threaded electrically conductive sleeve 26, which may for example be brass, and which may have fitted thereon a current collector 28 which may be copper.

The conductive sleeve 26 is provided with external threads 30 for receiving an internally threaded ferrule holder 32. The conductive sleeve 26 and the ferrule holder 32 cooperate to retain a ferrule 2 in position for stud welding operations. The interior wall 34 of the ferrule holder 32 is shaped complementally to the conically shaped exterior wall 10 of the ferrule 2.

Still referring to FIG. 9, it will be seen that as the ferrule holder 32 is screwed onto the conductive sleeve 26, the wall 34 of the holder 32 presses against the ferrule 2, thereby insuring good electrical contact between the holder 32 and the ferrule 2. Further, the holder 32 serves to place much of the ferrule material in compression. Compressive restraint enhances the strength of brittle materials, including various grades of graphite. Accordingly, the life expectancy of the ferrule is enhanced by the ferrule's operation in a condition of compression.

Figure 11:
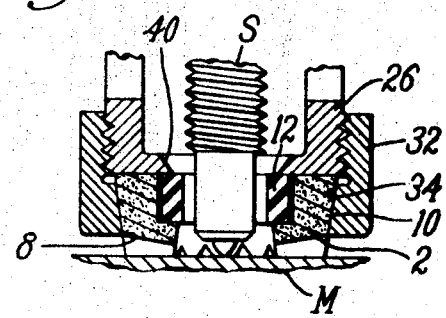
FIGS. 11—14 are elevational, partially sectional views of ferrule holders illustrative of alternative embodiments of the invention.

As mentioned above, the insulative ring 12 may be readily removable from the ferrule body 2 for reuse with other ferrules. Referring to FIG. 11, it will be seen that the conductive sleeve 26 may be provided with a flange portion 40 which overlays the ring 12 and retains the ring in place during welding operations.

Figure 12:
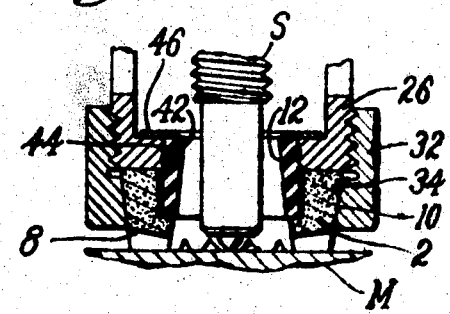

Also as mentioned above, the insulative ring 12 may be attached to the welding gun rather than to the ferrule. Referring to FIG. 12, there will be seen an example of such arrangement, the insulative ring 12 being threadedly connected to the conductive sleeve 26, the sleeve 26 being provided with internal threads 42 for receiving the ring 12 which in this embodiment is provided with external threads 44. A stop member 46 (FIG. 12) may be provided to facilitate proper positioning of the ring 12 on the sleeve 26.

Figure 13:
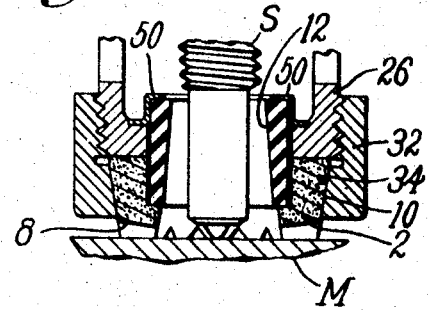
Figure 14:
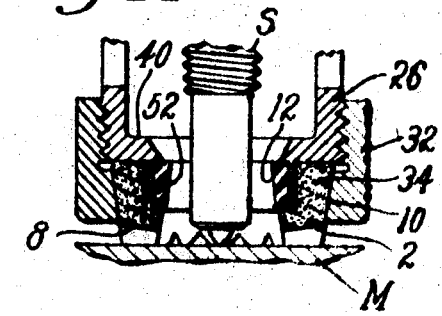

Referring to FIG. 13, it will be seen that the insulative ring 12 may, if preferred, be received and retained by a spring clip means 50 connected to the conductive sleeve 26. In FIG. 14 there is shown an embodiment in which the sleeve 26 is provided with an annular wall 52 extending from the flange portion 40 of the sleeve and enclosing the ring 12 whereby to further protect the ring 12 from deterioration.

In operation, a ferrule is selected and placed in the ferrule holder 32 which is then screwed onto the conductive sleeve 26 to compress the ferrule against the sleeve. A stud S is placed in the collet 20 of the welding gun. The collet 20 is tubular and receives the stud S therein. The gun is then positioned so as to bring the ferrule into contact with a support member M to which the stud S is to be welded. The stud S may be in contact with the support member M, as shown in FIG. 9, or may be slightly removed from the member M, as in many drawn-arc welding operations.

Upon closing of the welding circuit of the gun (not shown) electron flow extends through the collet 20 and the stud S. Arcs are drawn between the stud S and the member M. During the arcing period sufficient heat is generated to produce molten metal on the end of the stud S and on the support member M. The stud is then pressed onto the support member M, whereby to weld the stud to the support member.

During the welding operation, there is electron flow from the stud to the support member M. Inasmuch as the ferrule 2 is electrically conductive the electron flow through the support member M is picked up by the ferrule from whence the electron flow is through the conductive sleeve 26 to the current collector 28. In the vicinity of the weld, electron flow through the stud and the ferrule is in opposite directions. It has been found that such counter-current arrangement presents an electron field in the vicinity of the weld which results in a confining influence exercised on the molten metal, thereby restricting the molten metal to the immediate vicinity of the weld. Accordingly, little molten metal is wasted and the resulting weld is relatively strong and neat in appearance. Therefore, a unique feature of the present invention lies in the method by which the stud welding is attained.

It is to be understood that the present invention is by no means limited to the particular construction and method herein disclosed and/or shown in the drawings, but also comprises any modifications or equivalents within the scope of the disclosure. For example, the ferrule body 2 may be in a plurality of segments rather than a unitary annular member as shown in the drawings.

I claim:

1. A stud welding ferrule comprising a substantially nonconsumable and reusable annular body of electrically conductive material, said body having outside walls converging toward one end of said body, said one end of said body being provided with notches providing communication from the interior to the exterior of said body when said one end is placed in contact with a support member to which a stud is to be welded.

2. The invention according to claim 1 in which said body is provided with an interior ring of electrically insulative material.

3. The invention according to claim 2 in which said ring is removable from said ferrule.

4. The invention according to claim 2 in which said body material is of graphite and said interior ring is of boron nitride.

5. The invention according to claim 1 in which said body includes an exterior metal covering of beryllium copper.

6. A stud welding ferrule assembly comprising a substantially nonconsumable annular body of electrically conductive material, a coaxially telescoping holding means for said body, said body having axially inclined walls engageable with the ferrule holding means for assembling said ferrule therewith under compression while out of contact with the stud, and an interior ring of electrically insulative material seated in the central opening of said ferrule.

7. The assembly of claim 6 wherein said ring is of boron nitride.

8. The assembly of claim 6 wherein the inner wall of said insulative ring extends at an angle within the range of from 6-—15° to its axis.